United States Patent
Bush (10) Patent No.: US 11,292,226 B2
(45) Date of Patent: Apr. 5, 2022

(54) POLYMERIC NONWOVEN STRUCTURE FOR USE IN HIGH TEMPERATURE APPLICATIONS

(71) Applicant: Zephyros, Inc., Romeo, MI (US)

(72) Inventor: Kendall Bush, Macomb, MI (US)

(73) Assignee: Zephyros, Inc., Romeo, MI (US)

( * ) Notice: Subject to any disclaimer, the term of this patent is extended or adjusted under 35 U.S.C. 154(b) by 0 days.

(21) Appl. No.: 16/629,617

(22) PCT Filed: Jul. 9, 2018

(86) PCT No.: PCT/US2018/041221
§ 371 (c)(1),
(2) Date: Jan. 9, 2020

(87) PCT Pub. No.: WO2019/014096
PCT Pub. Date: Jan. 17, 2019

(65) Prior Publication Data
US 2020/0331230 A1  Oct. 22, 2020

Related U.S. Application Data

(60) Provisional application No. 62/530,339, filed on Jul. 10, 2017.

(51) Int. Cl.
*B32B 5/02* (2006.01)
*B32B 5/08* (2006.01)
(Continued)

(52) U.S. Cl.
CPC ............... *B32B 5/022* (2013.01); *B32B 3/06* (2013.01); *B32B 3/263* (2013.01); *B32B 5/08* (2013.01);
(Continued)

(58) Field of Classification Search
CPC .... B32B 5/02; B32B 5/08; B32B 5/26; B32B 2255/02; B32B 2255/205;
(Continued)

(56) References Cited

U.S. PATENT DOCUMENTS 6,588,080 B1 * 7/2003 Neely ................. A61F 13/537
156/181
2004/0180592 A1 * 9/2004 Ray ......................... B32B 5/26
442/38

(Continued)

FOREIGN PATENT DOCUMENTS

| WO | 2004/038116 A1 | 5/2004 |
| WO | 2006/107847 A1 | 10/2006 |
| WO | 2012/126763 A2 | 9/2012 |

OTHER PUBLICATIONS

International Search Report and Written Opinion for International Application PCT/US2018/041221, dated Sep. 21, 2018.

*Primary Examiner* — Joanna Pleszczynska
(74) *Attorney, Agent, or Firm* — The Dobrusin Law Firm, P.C.

(57) ABSTRACT

A fibrous structure including one or more nonwoven material layers comprising a fiber matrix, where the fiber matrix comprises polymeric binder fibers having a softening and/or melting temperature of about 190° C. or greater, where the article is adapted to withstand temperatures of about 190° C. or greater while in use; and where the article is a thermoacoustic insulation material.

20 Claims, 1 Drawing Sheet

(51) Int. Cl.
  B32B 5/26      (2006.01)
  D04H 1/541     (2012.01)
  D04H 1/4382    (2012.01)
  B32B 3/06      (2006.01)
  B32B 3/26      (2006.01)
  B32B 5/12      (2006.01)
  D04H 1/4334    (2012.01)
  D04H 1/435     (2012.01)
  D04H 1/74      (2006.01)

(52) U.S. Cl.
  CPC .............. *B32B 5/12* (2013.01); *B32B 5/26* (2013.01); *D04H 1/435* (2013.01); *D04H 1/4334* (2013.01); *D04H 1/43828* (2020.05); *D04H 1/74* (2013.01); *B32B 2255/02* (2013.01); *B32B 2255/205* (2013.01); *B32B 2255/26* (2013.01); *B32B 2260/021* (2013.01); *B32B 2262/0246* (2013.01); *B32B 2262/0261* (2013.01); *B32B 2262/0284* (2013.01); *B32B 2262/103* (2013.01); *B32B 2262/12* (2013.01); *B32B 2307/102* (2013.01); *B32B 2307/304* (2013.01); *B32B 2307/3065* (2013.01); *B32B 2307/416* (2013.01); *B32B 2307/7145* (2013.01); *B32B 2605/003* (2013.01)

(58) Field of Classification Search
  CPC ...... B32B 2260/021; B32B 2262/0284; B32B 2307/102; B32B 2307/304; D04H 1/43828
  See application file for complete search history.

(56) References Cited

U.S. PATENT DOCUMENTS

| | | | |
|---|---|---|---|
| 2006/0019568 A1* | 1/2006 | Toas | E04B 1/80 442/381 |
| 2009/0078499 A1* | 3/2009 | Sikes | F01N 13/1805 181/256 |
| 2013/0337246 A1* | 12/2013 | Turpin | B32B 5/022 428/213 |
| 2014/0227552 A1* | 8/2014 | Lau | B32B 5/26 428/621 |
| 2014/0272319 A1* | 9/2014 | Guzman | B32B 15/14 428/175 |

* cited by examiner

POLYMERIC NONWOVEN STRUCTURE FOR USE IN HIGH TEMPERATURE APPLICATIONS

FIELD

The present teachings relate generally to a fibrous material capable of withstanding high temperatures, and more particularly, a nonwoven fibrous material capable of providing thermoacoustic insulation even in high temperature environments.

BACKGROUND

Industry is looking for new ways to drive down emissions, particularly with transportation vehicles. However, these solutions to lower emissions cause heat generating components to be added to the power train. In particular, engine bay areas in transportation, off-highway, and industrial units are increasingly generating more heat, and the engines are running hotter as well.

Typical materials within an engine bay include open cell polyurethane foam and elastomeric foams. However, these materials can only survive temperatures between about 120° C. and about 150° C. Other materials, such as fiberglass and melamine foam, are used when temperatures exceed 150° C. However, these materials come at an increased cost, with increased difficulty in handling. These materials also pose health and safety issues and material robustness and/or performance issues. In addition, these materials may still have lower temperature resistance than needed. Melamine foam will deform and degrade quite severely at temperatures of about 180° C. to about 200° C., which causes issues with delamination, acoustic and/or thermal insulation performance, and aesthetics. Melamine foam is also brittle, creates a lot of dust, is typically manufactured with unsafe chemicals (and is toxic itself before it fully reacts), and does not mold well. Its raw material supply is limited, as the materials are costly, and they can only be obtained in particular dimensions. Fiberglass is known to be brittle or fracture when handled and when exposed to heavy vibrations, which causes glass fibers to fall out of the matrix, thereby degrading the material and its effectiveness. Fiberglass also commonly uses a phenolic binder, which is known to be toxic.

These foam or fiberglass materials also lack the flexibility to tune the insulation properties. The foams may be made from toxic ingredients, may be heavy, or may have a reduced thermoacoustic performance level. The cellular structures of foams, such as melamine or urethane foams, may also hold moisture. This may result in the development of mold or mildew or odors within the foam. Furthermore, foam may conduct heat more, or insulate less, when there is a presence of moisture.

Mineral wool, Rockwool, or superwool are very high temperature materials, which are cross laid. However, these materials have issues with compression, fracturing, degradation, and handling during assembly and during operation in the application.

Therefore, there remains a need for a material having a higher temperature resistance that is capable of also withstanding handling without degradation or fracturing. There remains a need for a material that provides thermoacoustic insulation. It is also desired to provide an insulator material having lower (i.e., better) thermal conductivity to provide thermal insulating benefits. It may also be desirable to provide an insulator that is more easily tuned or modified (e.g., during the manufacturing process) to provide the desired thermal insulating characteristics. It, therefore, may also be desirable to provide an insulation material that has more degrees of freedom for tuning. It may also be desirable to provide a material that is easily shaped to form a structure that can fit within a desired or intended space. Furthermore, it may be desirable to provide a structure that is capable of providing acoustic characteristics, such as to absorb sound coming from an engine or to improve the overall noise levels of a vehicle. It may also be desirable to provide a material that dries more quickly or does not retain moisture to reduce or prevent mold or mildew from developing within the material. It may also be desirable to provide a flexible material, a lighter weight material, a material made with less toxic or non-toxic materials, a moldable material, or a combination thereof.

SUMMARY

The present teachings meet one or more of the above needs by the improved devices and methods described herein. The present teachings provide a fibrous structure having improved temperature resistance to be used to provide thermoacoustic insulation in high environments where the temperature may exceed about 190° C. The present teachings include a fibrous structure having one or more nonwoven material layers comprising a fiber matrix. The fiber matrix may comprise polymeric binder fibers having a softening and/or melting temperature of about 190° C. or greater. The fibrous structure may be adapted to withstand temperatures of about 190° C. or greater while in use. The fibrous structure may be a thermoacoustic insulation material. The fibrous structure may be useful, for example, in automotive, commercial vehicle, and industrial markets, such as engine bay areas. The polymeric binder fibers may have a softening and/or melting temperature of about 225° C. or greater, about 230° C. or greater, or about 250° C. or greater. The polymeric binder fibers may include polyethylene terephthalate (PET), polytrimethylene terephthalate (PTT), polybutylene terephthalate (PBT), polyamide types, such as Nylons, or a combination thereof. The polymeric binder fibers may be bicomponent fibers. The fibrous structure may include one or more films, facings, fabrics, or a combination thereof laminated to one or more sides of the one or more nonwoven material layers. The one or more films, facings, or fabrics may have a temperature resistance that is greater than or equal to the temperature resistance of the polymeric binder fibers. The fiber matrix may include fibers of low flame and/or smoke emitting type (e.g., for compliance with flame and smoke standards for transportation). The fiber matrix may include fibers having IR reflective properties. The fibers having IR reflective properties may include metallized fibers. The metallization of the metallized fibers may be performed by distributing metal atoms on a surface of the fibers. The fibers of the fibrous structure may be oriented about ±40 degrees from vertical (e.g., a vertical plane extending generally perpendicular to the length of the fibrous structure). The fibers may be generally vertically or near-vertically oriented. The fibers may be generally oriented in a Z-shape, an S-shape, or a C-shape over the thickness of the fiber matrix. The fiber matrix may be compressed to after orientation of the fibers. The fiber matrix may be formed by distributing fibers via an air laying process or by a carding and lapping process. The lapping process may be vertically lapping, rotary lapping, or cross-lapping. The fiber matrix may include one or more additives selected from recycled waste, virgin (non-recycled) materials, binders, fillers (e.g., mineral fillers), adhesives, powders, thermoset resins, coloring agents, flame retardants, and longer staple fibers, or a combination thereof. The fibrous structure may be thermoformable. The fibrous structure may include one or more flexible portions to allow the fibrous structure to be positioned at least partially around the item to be insulated. The fibrous structure may include one or more fasteners for securing the fibrous structure within an assembly, for securing the fibrous structure to an item or within an area to be insulated, or for holding the fibrous structure in a desired shape. The fibrous structure may include one or more adhesives for securing the fibrous structure within an assembly, for securing the fibrous structure to the item to be insulated or within an area to be insulated, or for holding the fibrous structure in a desired shape.

The present teachings also contemplate any method of forming the fibrous structure as described herein. The method may include vertically lapping; rotary lapping; cross-lapping, or air laying fibers including polymeric binder fibers having a softening and/or melting temperature of about 190° C. or greater to form a nonwoven material layer. There may be a step of laminating the nonwoven material layer and optionally adding one or more film, facing, scrim, or pressure sensitive adhesive layers. The method may include molding the article to a desired three-dimensional shape (e.g., to match the shape of the area to which it will be installed).

The present teachings, therefore, provide a tunable insulator that may be 3D moldable, allow for mechanical features to be in-situ molded, allow for mechanical value-add attributes such as fastening/assembly mechanisms and folding or bending functionality. The present teachings may provide a nonwoven material capable of providing insulation, thermal resistance, sound absorption, or the like. The material as disclosed herein may be able to withstand high temperatures and not degrade upon exposure to temperatures of about 190° C. or greater. The present teachings may also provide for the ability to obtain a high-loft material at a relatively low weight with good resiliency and thickness retention, in combination with unique fibers, facings, and physical modifications to the three-dimensional structure (e.g., via processing), to create good thermal insulation capabilities versus traditional insulation materials.

DETAILED DESCRIPTION

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the description herein, but should instead be determined with reference to the appended claims, along with the full scope of equivalents to which such claims are entitled.

The disclosures of all articles and references, including patent applications and publications, are incorporated by reference for all purposes. Other combinations are also possible as will be gleaned from the following claims, which are also hereby incorporated by reference into this written description.

Insulation materials, such as fibrous structures, may have a wide range of applications, such as in automotive applications, generator set engine compartments, commercial vehicle engines, in-cab areas, construction equipment, agriculture equipment, architectural applications, flooring, floor-mat underlayments, and even heating, ventilating and air conditioning (HVAC) applications. Insulation materials may be used for machinery and equipment insulation, motor vehicle insulation, domestic appliance insulation, dishwashers, and commercial wall and ceiling panels. Insulation material may be used in an engine cavity of a vehicle, on the inner and/or outer dash panels, or under the carpeting in the cabin, for example. Insulation materials may also provide other benefits, such as sound absorption, compression resiliency, stiffness, structural properties, and protection (e.g., to an item around which the insulation material is located). The insulation material may also serve as a sound attenuation material in a vehicle, attenuating sound originating from outside a cabin of a motor vehicle and propagating toward the inside of the cabin.

The present teachings envision the use of a fibrous structure for providing insulation. Applications may include, but are not limited to, in-cabin insulation and/or external heat shielding for transportation and off-highway vehicles; thermoacoustic insulation in generator sets, air compressors, HVAC units, or other stationary or mobile mechanical unit where heat or noise is generated. For example, the fibrous structure as described herein may be located within an engine bay area of a transportation, off-highway, or industrial unit. The fibrous structure may be shaped to fit within the area to be insulated. The fibrous structure may be formed into the shape of a box or other enclosure or partial enclosure. The fibrous structure may be moldable or otherwise shaped. The fibrous structure may allow for mechanical features to be in-situ molded or allow for fastening or assembly mechanisms to be included. The fibrous structure may have folding and/or bending functionality (i.e., to allow the structure to be secured within an area to be insulated). The fibrous structure may include a fiber matrix. The fiber matrix may be a lofted, nonwoven material. The fibrous structure may include a plurality of layers (e.g., higher density materials, porous limp sheets, fabrics, scrims, meshes, adhesives, etc.). The layers may be attached to each other by one or more lamination processes, one or more adhesives, or a combination thereof.

The fibrous structure may include a fiber matrix. The fiber matrix may provide sufficient insulation by itself. The fiber matrix may have one or more layers located thereon or secured thereto to enhance insulation, sound absorption, structural properties, protection to the item to be insulated, or any combination thereof. The layers on the fibrous matrix may be one or more facing layers. The fibrous structure may include one or more layers that have a high loft (or thickness), at least in part due to the orientation of the fibers of the layer (e.g., vertical or near-vertical orientation, within ±40 degrees from vertical). The fibrous structure may be of a relatively low weight yet still exhibit good resiliency and thickness retention. The fibrous structure, due to factors such as, but not limited to, unique fibers, facings, physical modifications to the three-dimensional structure (e.g., via processing), orientation of fibers, or a combination thereof, may exhibit good thermal insulation capabilities versus traditional insulation materials.

The fibrous structure may include a fiber matrix that functions to provide high-temperature resistance, insulation, acoustic absorption, structural support and/or protection to the item around which the fibrous structure is formed or positioned or to the area within which the fibrous structure is located. The fiber matrix can be adjusted based on the desired properties. For example, the fiber matrix may be tuned to provide a desired temperature resistance, weight, thickness, compression resistance, or other physical attributes. The fiber matrix may be tuned to provide a desired thermal resistance. The fiber matrix may be tuned to provide a desired thermal conductivity. The fiber matrix may be formed from nonwoven fibers. The fibrous matrix may thus be a nonwoven structure. The fibrous matrix may be a lofted material. The fibers forming the fiber matrix may be a unique mixture of vertically or near-vertically oriented fibers. The fibers forming the fiber matrix may be a unique mixture of fibers having a generally Z-shape, C-Shape, or S-shape, which may be formed by compressing fibers having a vertical or near-vertically orientation. The fibers forming the fiber matrix may have an orientation within about ±60 degrees from vertical, about ±50 degrees from vertical, or about ±40 degrees from vertical. Vertical may be understood to be relative to a plane extending generally transverse from the longitudinal axis of the fibrous structure. Therefore, a vertical fiber orientation means that the fibers are generally perpendicular to the length of the fibrous structure (e.g., fibers extending in the thickness direction).

The material fibers that make up a fiber matrix may have an average linear mass density of about 0.5 denier or greater, about 1 denier or greater, or about 5 denier or greater. The material fibers that make up the fiber matrix may have an average linear mass density of about 25 denier or less, about 20 denier or less, or about 15 denier or less. Fibers may be chosen based on considerations such as temperature resistance, cost, resiliency, desired thermal conductivity, or the like. For example, a coarser blend of fibers (e.g., a blend of fibers having an average denier of about 12 denier) may help maintain thickness of the matrix during molding so that the fiber may fill the thickest areas of the mold. This blend of fibers may provide resiliency to the fiber matrix. A finer blend may be used, for example, if thermal conductivity may be further controlled. The fibers may have a staple length of about 1.5 millimeters or greater. The fibers may have a staple length of up to about 70 millimeters or greater (e.g., for carded fibrous webs). For example, the length of the fibers may be between about 30 millimeters and about 65 millimeters. The fibers may have an average or common length of about 50 to 60 millimeters staple length, or any length typical of those used in fiber carding processes. Short fibers may be used (e.g., alone or in combination with other fibers) in any nonwoven processes, such as the formation of air laid fibrous webs. For example, some or all of the fibers may be a powder-like consistency (e.g., with a fiber length of about 2 millimeters to about 3 millimeters, or even smaller, such as about 200 microns or greater or about 500 microns or greater). Fibers of differing lengths may be combined to provide desired insulation and/or acoustic properties. The fiber length may vary depending on the application; the temperatures to which the fibrous structure is to be exposed; the insulation properties desired; the acoustic properties desired; the type, dimensions and/or properties of the fibrous material (e.g., density, porosity, desired air flow resistance, thickness, size, shape, and the like of the fiber matrix and/or any other layers of the fibrous structure); or any combination thereof. The addition of shorter fibers, alone or in combination with longer fibers, may provide for more effective packing of the fibers, which may allow pore size to be more readily controlled in order to achieve desirable characteristics (e.g., acoustic and/or insulation characteristics).

The fibers forming the fiber matrix may be natural or synthetic fibers. Suitable natural fibers may include cotton, jute, wool, cellulose, glass, and ceramic fibers. Suitable synthetic fibers may include polyester, polypropylene, polyethylene, Nylon, aramid, imide, acrylate fibers, or combination thereof. The fiber matrix material may comprise polyester fibers, such as polyethylene terephthalate (PET), and co-polyester/polyester (CoPET/PET) adhesive bi-component fibers. The fibers may include polyacrylonitrile (PAN), oxidized polyacrylonitrile (Ox-PAN, OPAN, or PANOX), olefin, polyamide, polyetherketone (PEK), polyetheretherketone (PEEK), polyethersulfone (PES), or other polymeric fibers. The fibers may be selected for their melting and/or softening temperatures. The fibers may include mineral or ceramic fibers. The fibers may be formed of any material that is capable of being carded and lapped into a three-dimensional structure. The fibers may be 100% virgin fibers, or may contain fibers regenerated from post-consumer waste (for example, up to about 90% fibers regenerated from postconsumer waste or even up to 100% fibers regenerated from postconsumer waste). The fibers may have or may provide improved thermal insulation properties. The fibers may have relatively low thermal conductivity. The fibers may have geometries that are non-circular or non-cylindrical to alter convective flows around the fiber to reduce convective heat transfer effects within the three-dimensional structure. The fiber matrix may include or contain engineered aerogel structures to impart additional thermal insulating benefits.

The fibers, or at least a portion of the fibers, may have high infrared reflectance or low emissivity. At least some of the fibers may be metallized to provide infrared (IR) radiant heat reflection. To provide heat reflective properties to and/or protect the fiber matrix, the fibers may be metalized. For example, fibers may be aluminized. The fibers themselves may be infrared reflective (e.g., so that an additional metallization or aluminization step may not be necessary). Metallization or aluminization processes can be performed by depositing metal atoms onto the fibers. As an example, aluminization may be established by applying a layer of aluminum atoms to the surface of fibers. Metalizing may be performed prior to the application of any additional layers to the fiber matrix. It is contemplated that other layers of the fibrous structure may include metallized fibers in addition to, or instead of, having metallized fibers within the fiber matrix.

The metallization may provide a desired reflectivity or emissivity. The metallized fibers may be about 50% IR reflective or more, about 65% IR reflective or more, or about 80% IR reflective or more. The metallized fibers may be about 100% IR reflective or less, about 99% IR reflective or less, or about 98% IR reflective or less. For example, the emissivity range may be about 0.01 or more or about 0.20 or less, or 99% to about 80% IR reflective, respectively. Emissivity may change over time as oil, dirt, degradation, and the like may impact the fibers in the application.

Other coatings may be applied to the fibers, metallized or not, to achieve desired properties. Oleophobic and/or hydrophobic treatments may be added. Flame retardants may be added. A corrosion resistant coating may be applied to the metalized fibers to reduce or protect the metal (e.g., aluminum) from oxidizing and/or losing reflectivity. IR reflective coatings not based on metallization technology may be added.

The fiber matrix (or any other layer of the fibrous structure) may include a plurality of high-temperature binder fibers. These fibers may be capable of withstanding high temperatures within the area it is installed. The binder fibers may define the maximum heat to which the entire fibrous structure can be exposed without degradation. The binder fibers may have a softening and/or melting temperature of about 180° C. or greater; about 200° C. or greater, about 225° C. or greater; about 230° C. or greater, or even about 250° C. or greater. The fibers may be high-temperature thermoplastic materials. The fibers may include one or more of polyamideimide (PAI); high-performance polyimide (HPPA), such as Nylons; polyimide (PI); polyketone; polysulfone derivatives; polycyclohexane dimethyl-terephthalate (PCT); fluoropolymers; polyetherimide (PEI); polybenzimidazole (PBI); polyethylene terephthalate (PET); polytrimethylene terephthalate (PTT); polybutylene terephthalate (PBT); polyphenylene sulfide; syndiotactic polystyrene; polyetherether ketone (PEEK); polyphenylene sulfide (PPS), polyether imide (PEI); polytrimethylene terephthalate (PTT); and the like. The fiber matrix may include polyacrylate and/or epoxy (e.g., thermoset and/or thermoplastic type) fibers. The fiber matrix may include a multi-binder system. The fiber matrix may include one or more sacrificial binder materials and/or binder materials having a lower melting temperature than the high-temperature binder fibers. The fibers may be bi-component fibers, where at least a portion of the fiber is a high-temperature binder fiber.

The fiber matrix (or any other layer of the fibrous structure) may include a plurality of bi-component fibers. The bi-component fibers may be a thermoplastic lower melt bi-component fiber. The bi-component fibers may have a lower melting temperature than the other fibers within the mixture (e.g., a lower melting temperature than common or staple fibers). The hi-component fibers may enable the fiber matrix to be air laid or mechanically carded, lapped, and fused in space as a network so that the material may have structure and body and can be handled, laminated, fabricated, installed as a cut or molded part, or the like to provide insulation properties, acoustic absorption, or both. The bi-component fibers may include a core material and a sheath material. The sheath material may have a lower melting point than the core material. The web of fibrous material may be formed, at least in part, by heating the material to a temperature to soften the sheath material of at least some of the bi-component fibers. The temperature to which the fiber matrix (or other layer of the fibrous structure) is heated to soften the sheath material of the bi-component may depend upon the physical properties of the sheath material. Some fibers or parts of the fibers (e.g., the sheath) may be crystalline, or partially crystalline. Some fibers or parts of the fibers (e.g., the sheath) may be amorphous.

For a polyethylene or polypropylene sheath, for example, the temperature may be about 140 degrees C. or greater, about 150 degrees C. or greater, or about 180 degrees C. or greater. The temperature may be about 220 degrees C. or less, about 210 degrees C. or less, or about 200 degrees C. or less. Bi-component fibers having a polyethylene terephthalate (PET) sheath or a polybutylene terephthalate (PBT) sheath, for example, may melt at about 180 degrees C. to about 240 degrees C. (e.g., about 230 degrees C.). The bi-component fibers may be formed of short lengths chopped from extruded bi-component fibers. The bi-component fibers may have a sheath-to-core ratio (in cross-sectional area) of about 15% or more, about 20% or more, or about 25% or more. The bi-component fibers may have a sheath-to-core ratio of about 50% or less, about 40% or less, or about 35% or less.

The fibers of the fiber matrix may be blended or otherwise combined with suitable additives such as other forms of recycled waste, virgin (non-recycled) materials, binders, fillers (e.g., mineral fillers), adhesives, powders, thermoset resins, coloring agents, flame retardants, longer staple fibers, etc., without limitation. Any, a portion, or all of the fibers used in the matrix could be of the low flame and/or smoke emitting type (e.g., for compliance with flame and smoke standards for transportation).

In some applications, the use of shorter fibers may have advantages for forming an insulation material that may also exhibit acoustic absorption properties. The selected air flow resistivity achieved using short fibers may be significantly higher than the air flow resistivity of a conventional nonwoven material comprising substantially only conventional staple fibers having a long length of, for example, from at least about 30 mm and less than about 100 mm. Without being limited by theory, it is believed that this unexpected increase in air flow resistance may be attained as a result of the short fibers being able to pack more efficiently (e.g., more densely) in the nonwoven material than long fibers. The shorter length may reduce the degree of disorder in the packing of the fibers as they are dispersed onto a surface, such as a conveyor, or into a preformed web during production. The more ordered packing of the fibers in the material may in turn lead to an increase in the air flow resistivity. In particular, the improvement in fiber packing may achieve a reduced interstitial space in between fibers of the nonwoven material to create a labyrinthine structure that forms a tortuous path for air flow through the material, thus providing a selected air flow resistance, and/or selected air flow resistivity. Accordingly, it may be possible to produce comparatively lightweight nonwoven materials without unacceptably sacrificing performance.

The fibers forming the fiber matrix may be formed into a nonwoven web using nonwoven processes including, for example, blending fibers, carding, lapping, air laying, mechanical formation, or a combination thereof. Through these processes, the fibers may be oriented in a generally vertical direction or near-vertical direction (e.g., in a direction generally perpendicular to the longitudinal axis of the fiber matrix). The fibers may be opened and blended using conventional processes. The resulting structure formed may be a lofted fiber matrix. The lofted matrix may be engineered for optimum weight, thickness, physical attributes, thermal conductivity, insulation properties, acoustic absorption, or a combination thereof.

The fibrous web may be formed, at least in part, through a carding process. The carding process may separate tufts of material into individual fibers. During the carding process, the fibers may be aligned in substantially parallel orientation with each other and a carding machine may be used to produce the web.

A carded web may undergo a lapping process to produce the lofted fiber matrix. The carded web may be rotary lapped, cross-lapped, or vertically lapped, to form a voluminous or lofted nonwoven material. The carded web may be vertically lapped according to processes such as "Struto" or "V-Lap", for example. This construction provides a web with relative high structural integrity in the direction of the thickness of the fiber matrix, thereby minimizing the probability of the web falling apart during application, or in use, and/or providing compression resistance to the fibrous structure when it is installed around the item to be insulated. Carding and lapping processes may create a nonwoven fiber layer that has good compression resistance through the vertical cross-section (e.g., through the thickness of the material) and may enable the production of a lower mass fiber matrix, especially with lofting to a higher thickness without adding significant amounts of fiber to the matrix. It is contemplated that a small amount of hollow conjugate fiber (i.e., in a small percentage) may improve lofting capability and resiliency to improve insulation, sound absorption, or both. Such an arrangement also provides the ability to achieve a low density web with a relatively low bulk density.

The fiber matrix may be formed by an air laying process. This air laying process may be employed instead of carding and/or lapping. In an air laying process, fibers are dispersed into a fast moving air stream, and the fibers are then deposited from a suspended state onto a perforated screen to form a web. The deposition of the fibers may be performed by means of pressure or vacuum, for example. An air laid or mechanically formed web may be produced. The web may then be thermally bonded, air bonded, mechanically consolidated, the like, or combination thereof, to form a cohesive nonwoven insulation material. While air laying processes may provide a generally random orientation of fibers, there may be some fibers having an orientation that is generally in the vertical direction so that resiliency in the thickness direction of the material may be achieved.

The fiber matrix formed (e.g., via carding and lapping or via air laying) may have a generally vertical fiber orientation, where vertical is defined as extending along the thickness of the material between the top surface and the bottom surface of the material or extending generally along a transverse plane extending through the cross-section of the material. The fibers of the fiber matrix may have a near vertical orientation, wherein near vertical is measured as within about ±20 degrees from vertical, about ±10 degrees from vertical, or about ±5 degrees from vertical. The orientation of fibers may be altered after the carding, lapping, and/or air laying. This vertical (e.g., via vertical lapping) or near-vertical orientation of fibers (e.g., via rotary lapping) may produce a fiber matrix with sufficient insulation capabilities or sufficient thermal conductivity to meet the needs of the application. However, it is also contemplated that the fiber orientation may be altered to tune the thermal conductivity or insulation capabilities. For example, the fiber orientation may be altered to provide a measurement of about ±60 degrees from vertical, about ±50 degrees from vertical, or about ±40 degrees from vertical. The fiber matrix may be compressed, gauged, thermoformed, or the like, to a reduced thickness. The fiber matrix may be compressed by 10% or more, about 20% or more, or about 30% or more. The fiber matrix may be compressed by about 70% or less, about 65% or less, or about 60% or less. When the thickness is reduced, this may cause the fibers to become non-vertical. For example, the fibers may have a general Z-type, C-type, or S-type shape through the cross section after compression or reduction of thickness. A non-vertical fiber orientation (e.g., due to compression, gauging, or thermoforming) may reduce the direct short-circuit type of conductive heat transfer from one surface of the fiber matrix to the other through the fiber filaments. Such non-vertical fiber orientation may also provide for blocking of a direct convective heat transfer path for heat flow through the fiber matrix. As such, a non-vertical (e.g., Z-type, C-type, or S-type) shape may create a baffle effect to conductive and/or convective heat transport. While shapes are referred to herein as Z-type, C-type, or S-type, the non-vertical orientation of fibers is not limited to these shapes. The shapes could be a combination of these types, may be free-form shapes having an irregular contour, or may be other types of non-vertical orientations.

The fiber matrix, the fibers forming the fiber matrix, the resulting fibrous structure, or a combination thereof, may be used to form a thermoformable nonwoven material, which indicates a nonwoven material that may be formed with a broad range of densities and thicknesses and that contains a thermoplastic and/or thermoset binder. The thermoformable nonwoven material may be heated and thermoformed into a specifically shaped thermoformed product. The nonwoven material may have a varying thickness (and therefore a varied or non-planar profile) along the length of the material. Areas of lesser thickness may be adapted to provide controlled flexibility to the fibrous structure, such as to provide an area that is folded (to produce a box or other enclosure surrounding the item to be insulated) or otherwise shaped, such as to form a corner or angled portion (e.g., to serve as the vertex between two thicker portions of the material) to allow the fibrous structure to be shaped. The fibrous structure may be shaped (e.g., by folding, bending, thermoforming, molding, and the like) to produce a box-like structure, a structure that is capable of at least partially surrounding an item to be insulated, or to fit within a desired area, such as within an engine bay. The fibrous structure may include an inner surface, which faces the item to be insulated, and the inner surface may be shaped to generally match the shape of the item to be insulated so that the fibrous structure can be installed around the item or so that the item can be received within the fibrous structure.

The fibrous structure may include one or more layers. A fibrous structure may be formed solely from the fiber matrix. The fibrous structure may include the fiber matrix and one or more additional layers. The fibrous structure may include two or more fiber matrix layers. The fibrous structure may include one or more lofted layers, one or more skin layers, one or more facing layers, one or more foils, one or more films, or a combination thereof. The one or more layers may be formed from metals, fibrous material, polymers, or a combination thereof. A skin may be formed by melting a portion of the layer by applying heat in such a way that only a portion of the layer, such as the top surface, melts and then hardens to form a generally smooth surface. The fibrous structure may include a plurality of layers, some or all of which serve different functions or provide different properties to the fibrous structure (when compared to other layers of the fibrous structure). The ability to combine layers and skins of materials having different properties may allow the fibrous structure to be customized based on the application. The additional layers may function to provide additional insulation properties, protection to the fiber matrix or other layers, infrared reflective properties, conductive properties (or reduction of conductive properties), convective properties (or reduction of convective properties), structural properties, or a combination thereof. The one or more layers may have a temperature resistance that is greater than or equal to the temperature resistance of the high-temperature binder fibers. The one or more layers may have a melting or softening temperature that is greater than the temperatures to which the layers would be exposed while installed in an assembly. The one or more layers may act as a moisture barrier to keep moisture in (e.g., within the inner walls of the fibrous structure) or to keep moisture out (e.g., away from the item to be insulated). The one or more layers may act as a chemical barrier or as a barrier to keep dirt, dust, debris, or other unwanted particles or substances away from the item to be insulated. For example, one or more fibrous structure layers may provide insulation. One or more fibrous structure layers may include one or more adhesive materials (e.g., as part of the fibers of the layer or as a separate element in or on the layer) for binding the fibers together, for binding layers together, or both. One or more fibrous structure layers may support a skin layer, other material layer, or both. One or more fibrous structure layers may provide heat resistance (e.g., if the fibrous structure is located in an area that is exposed to high temperatures). One or more fibrous structure layers may provide stiffness to the fibrous structure. Additional stiffness, structural properties, compression resistance, compression resiliency, or a combination thereof, may be provided by additional layers (or one or more layers in combination with the one or more fibrous matrix layers). One or more fibrous structure layers may provide flexibility and/or softness to the fibrous composite.

Any of the fibers or materials as discussed herein, especially with respect to the fiber matrix and/or processes of forming the fiber matrix, may also be employed to form or may be included within any of the additional layers of the fibrous structure, such as facing layers. Any of the materials described herein may be combined with other materials described herein (e.g., in the same layer or in different layers of the fibrous structure). The layers may be formed from different materials. Some layers, or all of the layers, may be formed from the same materials, or may include common materials or fibers. The type of materials forming the layers, order of the layers, number of layers, positioning of layers, thickness of layers, or a combination thereof, may be chosen based on the desired properties of each material (e.g., infrared reflectivity, insulation properties, conductive properties, convective properties), the insulation properties of the fibrous structure as a whole, the heat transfer properties of the fibrous structure as a whole, the desired air flow resistive properties of the fibrous structure as a whole, the desired weight, density and/or thickness of the fibrous structure (e.g., based upon the space available where the fibrous composite will be installed), the desired flexibility of the structure (or locations of controlled flexibility), or a combination thereof. The layers may be selected to provide varying orientations of fibers, which may reduce conductive heat transfer from one side of the fibrous structure to the other through the fibers, to reduce convective heat transfer for heat flow through the fibrous structure, or both. One or more fibrous structure layers may be any material known to exhibit sound absorption characteristics, insulation characteristics, or both. One or more fibrous structure layers may be at least partially formed as a web of material (e.g., a fibrous web). One or more fibrous composite layers may be formed from nonwoven material, such as short fiber nonwoven materials. One or more fibrous structure layers may be a porous bulk absorber (e.g., a lofted porous bulk absorber formed by a carding and/or lapping process). One or more fibrous structure layers may be formed by air laying. The fibrous structure may be formed into a generally flat sheet. The fibrous structure (e.g., as a sheet) may be capable of being rolled into a roll. The fibrous structure (or one or more of the fibrous structure layers) may be an engineered 3D structure. It is clear from these potential layers that there is great flexibility in creating an insulation material that meets the specific needs of an end user, customer, installer, and the like.

The one or more layers may be located on or attached to the fiber matrix. Layers may be directly attached to the fiber matrix. Layers may be attached indirectly to the fiber matrix (e.g., via an adhesive layer and/or another layer therebetween). For example, the fibrous structure may include one or more facing layers. Any or all of the layers, such as a facing layer or an intermediate layer (e.g., a layer between two fiber matrix layers) may function to provide additional insulation, protection to the fiber matrix, infrared reflective properties, structural properties, or a combination thereof. The layer may serve as a barrier for moisture, chemicals, dust, debris, or other particles or substances. For example, the fiber matrix may have a facing layer on the side of the fiber matrix that faces the source of heat within the assembly. The fiber matrix may have a facing layer located on the side of the fiber matrix that faces away from the source of heat within the assembly. The fiber matrix may be sandwiched between two (or more) facing layers. A layer (e.g., of a different composition) may be sandwiched between two layers of fiber matrix. A facing layer, or an intermediate layer, may be generally coextensive with the side of the fiber matrix. The facing layer, or an intermediate layer, may instead cover or be attached to only a portion of a side of the fiber matrix. The facings or intermediate layers may include solid films, perforated films, solid foils, perforated foils, woven or nonwoven scrims, or other materials. For example, fibers forming the facing layer (e.g., if formed as a scrim) or the surface itself may be metallized to impart infrared reflectivity, thus providing an improved thermal insulating value to the overall fibrous structure. Any of the layers may have a thermal resistance capable of withstanding the temperatures to which the layers will be exposed.

The layers of material forming the fibrous structure (e.g., one or more facing layers) may be bonded together to create the finished fibrous structure. One or more layers may be bonded together by elements present in the layers. For example, the binder fibers in the layers may serve to bond the layers together. The outer layers (i.e., the sheath) of bi-component fibers in one or more layers may soften and/or melt upon the application of heat, which may cause the fibers of the individual layers to adhere to each other and/or to adhere to the fibers of other layers. Layers may be attached together by one or more lamination processes. One or more adhesives may be used to join two or more layers. The adhesives may be a powder or may be applied in strips, sheets, or as a liquid, for example.

The total thickness of the fibrous structure may depend upon the number and thickness of the individual layers. It is contemplated that the total thickness may be about 0.5 mm or more, about 1 mm or more, or about 1.5 mm or more. The total thickness may be about 300 mm or less, about 250 mm or less, or about 175 mm or less. For example, the thickness may be in the range of about 2 mm to about 155 mm or about 4 mm to about 30 mm. It is also contemplated that some of the individual layers may be thicker than other layers. The thickness may vary between the same types of layers as well. For example, two lofted layers in the fibrous structure may have different thicknesses. The fibrous structure may be tuned to provide desired insulation characteristics and/or more general broad band sound absorption by adjusting the specific air flow resistance and/or the thickness of any or all of the layers.

A fibrous structure or one or more layers thereof (e.g., nonwoven material) may be formed to have a thickness and density selected according to the required physical, insulative, and air permeability properties desired of the finished fibrous layer (and/or the fibrous structure as a whole). The layers of the fibrous structure may be any thickness depending on the application, location of installation, shape, fibers used (and the lofting of the fiber matrix layer), or other factors. The density of the layers of the fibrous structure may depend, in part, on the specific gravity of any additives incorporated into the material comprising the layer (such as nonwoven material), and/or the proportion of the final material that the additives constitute. Bulk density generally is a function of the specific gravity of the fibers and the porosity of the material produced from the fibers, which can be considered to represent the packing density of the fibers.

Insulation properties, acoustic properties, or both, of the fibrous structure (and/or its layers) may be impacted by the shape of the fibrous structure. The fibrous structure, or one or more of its layers, may be generally flat. The finished fibrous structure may be fabricated into cut-to-print two-dimensional flat parts for installation into the end user, installer, or customer's assembly. The fibrous structure may be formed into any shape. For example, the fibrous structure may be molded (e.g., into a three-dimensional shape) to generally match the shape of the area to which it will be installed or the item to which it is meant to insulate. The finished fibrous structure may be molded-to-print into a three-dimensional shape for installation into the end user, installer, or customer's assembly.

The fibrous structure can be tuned to exhibit a desired thermal conductivity. Based on the processes employed for creating the fibrous structure and/or the fibers selected, thermal conductivity can be altered. For example, if the fiber matrix is purely vertically lapped or slightly off-vertical (e.g., via rotary lap), the thermal conductivity may be higher than if the composite is gauged or thermoformed to have a lower thickness. During gauging or thermoforming, the vertical structure of the fibers may become non-vertical (e.g., forming an angle with the vertical axis, or having a Z-shape, C-shape, or S-shape). The non-vertical or Z-shape, C-shape, or S-shape as seen through a cross section or side view of the fiber matrix (or fibrous structure) may reduce the direct short-circuit type of conductive heat transfer from one side of the matrix or structure to the other through vertical fiber filaments. The same occurs for blocking the direct convective heat transfer path for heat flow through the vertical structure. The non-vertical or Z-shape of the fibers may create a baffle effect to conductive and/or convective heat transport.

The insulation material as described herein may also provide sound absorption characteristics. With fibrous materials, air flow resistance and air flow resistivity are important factors controlling sound absorption. Air flow resistance Air flow resistance is measured for a particular material at a particular thickness. The air flow resistance is normalized by dividing the air flow resistance (in Rayls) by the thickness (in meters) to derive the air flow resistivity measured in Rayls/m. ASTM standard C522-87 and ISO standard 9053 refer to the methods for determination of air flow resistance for sound absorption materials. Within the context of the teachings herein, air flow resistance, measured in mks Rayls, will be used to specify the air flow resistance; however other methods and units of measurement are equally valid. Within the context of the described teachings, air flow resistance and air flow resistivity can be assumed to also represent the specific air flow resistance, and specific air flow resistivity, respectively. Acoustic materials for sound absorption may have a relatively high air flow resistance to present acoustic impedance to the sound pressure wave incident upon the material. Air permeability should be managed to ensure predictable and consistent performance. This may be achieved through management of fiber sizes, types, and lengths, among other factors. A homogeneous, short fiber nonwoven textile may be desirable. In some applications, desirable levels of air permeability may be achieved by combining plural nonwoven materials of differing densities together to form a composite product.

Insulation, sound absorption, or both, can be tuned by adding one or more layers to the fibrous structure. These layers may have different levels of thermal conductivity. These layers may have different levels of specific air flow resistance. In a multi-layer fibrous structure, some layers may have a lower air flow resistance while other layers may have a higher air flow resistance. The layering of layers having different air flow resistive properties may produce a multi-impedance acoustic mismatched profile through the entire fibrous structure, which provides improved noise reduction capability of the fibrous structure. Therefore, the layers (or skins) may be arranged so that a layer (or skin) of higher specific air flow resistance is joined to, or formed on, or is adjacent to one or more layers of a different specific air flow resistance (e.g., a lower air flow resistance).

A low density fibrous material, which may be one or more of the fibrous structure layers, may be designed to have a low density, with a finished thickness of about 1.5 mm or more, about 4 mm or more, about 5 mm or more, about 6 mm or more, or about 8 mm or more. The finished thickness may be about 350 mm or less, about 250 mm or less, about 150 mm or less, about 75 mm or less, or about 50 mm or less. The fibrous material, which may be one or more of the fibrous structure layers, may be formed as a relatively thick, low density nonwoven, with a bulk density of 10 kg/m$^3$ or more, about 15 kg/m$^3$ or more, or about 20 kg/m$^3$ or more. The thick, low density nonwoven may have a bulk density of about 200 kg/m$^3$ or less, about 100 kg/m$^3$ or less, or about 60 kg/m$^3$ or less. The fibrous material (e.g., serving as one or more fibrous structure layers) thus formed may have an air flow resistivity of about 400 Rayls/m or more, about 800 Rayls/m or more, or about 100 Rayls/m or more. The fibrous composite material may have an air flow resistivity of about 200,000 Rayls/m or less, about 150,000 Rayls/m or less, or about 100,000 Rayls/m or less. Low density fibrous composite materials may even have an air flow resistivity of up to about 275,000 Rayls/m.

Additional sound absorption may also be provided by a skin layer on the fibrous composite layer (e.g., by an in-situ skinning process). A skin layer of the fibrous composite may provide additional air flow resistance (or air flow resistivity) to the fibrous composite. For example, the skin layer may have an air flow resistivity of about 100,000 Rayls/m or higher, about 275,000 Rayls/m or higher, 1,000,000 Rayls/m or higher, or even 2,000,000 Rayls/m or higher.

The fibrous structure may cover at least a portion of an item to be insulated. The fibrous structure may be secured at least partially around an item to be insulated. The fibrous structure may be secured within an assembly, such as an automotive assembly. The fibrous structure may be secured to the item to be insulated. One or more fibrous structure layers may attach directly to a wall, surface of a substrate, surface of the item to be insulated, or a combination thereof. The fibrous structure may be attached via a fastener, adhesive, or other material capable of securing the fibrous structure to a wall, substrate, or item to be insulated. The securing of the fibrous structure to itself or to another surface may be repositionable or permanent. The fibrous structure may include one or more fasteners, adhesives, or other known materials for joining a fibrous structure to a substrate, another portion of the fibrous structure, another fibrous structure, or a combination thereof. The fastener, adhesive, or other means of attachment may be able to withstand the elements to which it is exposed (e.g., temperature fluctuations). Fasteners may include, but are not limited to, screws, nails, pins, bolts, friction-fit fasteners, snaps, hook and eye fasteners, zippers, clamps, the like, or a combination thereof. Adhesives may include any type of adhesive, such as a tape material, a peel-and-stick adhesive, a pressure sensitive adhesive, a hot melt adhesive, the like, or a combination thereof. The fastener or adhesive, for example, that joins portions of the fibrous structure together may allow the fibrous structure to enclose or at least partially surround the item to be insulated and may hold the fibrous structure in that position. The fibrous structure may include one or more fasteners or adhesives to join portions of the fibrous structure to another substrate. For example, the fibrous structure may be secured to a portion of the assembly, such as a vehicle assembly, to hold the fibrous structure in place within the assembly.

The one or more fasteners may be separately attached to or integrally formed with one or more layers of the fibrous structure. For example, the fibrous structure may include one or more tabs, projections, or a male-type fastener portion (e.g., at one end of the fibrous structure), and a corresponding opening or female-type fastener portion (e.g., on the opposing end of the fibrous structure) that can be received within the male-type fastener portion to hold the fibrous structure in a desired position. When the fibrous structure is to be formed into the desired shape (e.g., to surround the item to be insulated), the end of the fibrous structure can be attached to the opposing end, thereby forming an enclosure. For example, if the fibrous structure is wrapped around an item to be insulated, the ends of the fibrous structure can be secured together to hold the fibrous structure in position around the item to be insulated.

The adhesive may be a pressure sensitive adhesive (PSA). The PSA may be located on any part of the fibrous structure. For example, the PSA may be located on an inner surface of the fibrous structure that faces the item to be insulated, which may allow the fibrous structure to be attached to the item to be insulated. The PSA may be located on an outer surface of the fibrous structure that faces away from the item to be insulated, which may allow the fibrous structure to be secured to a wall or surface within the assembly, such as a vehicle assembly. The PSA may be located on a portion of the fibrous structure that contacts another portion of the fibrous structure (or another fibrous structure) so that the fibrous structure holds its desired shape and/or position. The PSA may be located between one or more layers of the fibrous structure (e.g., to join one or more layers). The PSA may be applied from a roll and laminated to at least a portion of the fibrous structure. A release liner may carry the PSA. Prior to installation of the fibrous structure, the release liner may be removed from the PSA to allow the fibrous structure to be adhered to a substrate, the item to be insulated, or to another portion of the fibrous structure, for example. It is contemplated that the release liner may have a high tear strength that is easy to remove to provide peel-and-stick functionality and to ease installation. The PSA may coat a portion of the fibrous structure. The PSA may coat an entire side or surface of the fibrous structure. The PSA may be coated in an intermittent pattern. The intermittent coating may be applied in strips or in any pattern, which may be achieved by hot-melt coating with a slot die, for example, although it can also be achieved by coating with a patterned roller or a series of solenoid activated narrow slot coating heads, for example, and may also include water and solvent based coatings, in addition to hot-melt coating. Where the PSA coating is applied intermittently, the spacing of the strips or other shape may vary depending on the properties of the fibrous structure. For example, a lighter fibrous material may need less PSA to hold the material in place. A wider spacing or gap between the strips can facilitate easier removal of the substrate, as a person can more readily find uncoated sections that allow an edge of the substrate to be lifted easily when it is to be peeled away to adhere the fibrous structure material to another surface. The pressure sensitive adhesive substance may be an acrylic resin that is curable under ultraviolet light, such as AcResin type D53583 available from BASF of Germany. A PSA substance may be applied to substrate in a thickness of about 10 to about 150 microns, for example. The thickness may alternatively be from about 20 to about 100 microns, and possibly from about 30 to about 75 microns, for example. Other types of PSA substance and application patterns and thicknesses may be used, as well as PSA substances that can be cured under different conditions, whether as a result of irradiation or another curing method. For example, the PSA substance may comprise a hot-melt synthetic rubber-based adhesive or a UV-curing synthetic rubber-based adhesive. The PSA substance may be cured without UV curing. For example, the PSA could be a solvent or emulsion acrylic which may not require UV curing.

The finished fibrous structures provide advantages over traditional insulation and/or sound absorption materials. For example, finished fibrous structures may be able to be molded. The finished fibrous structures may be flexible. The fibrous structures may not be as brittle as melamine, for example. The finished fibrous structure may have more accessible and/or less expensive raw materials. The finished fibrous structures may be non-toxic or contain less toxic materials than foams such as melamine foam or polyurethane foams. The finished fibrous structures may be able to dry faster than other materials, such as foam. The finished fibrous structures may allow water or moisture to move through the open spaces between the fibers. The open spaces may have a higher surface area (e.g., than other materials such as foams), which allows for evaporation of moisture prior to development of any mold or mildew, for example. The finished fibrous structure comprises a material whose properties can be adjusted via many methods. Adjustment can be made by altering thickness, density, fiber matrix (e.g., types of fibers, lengths of fibers, distribution of fibers, loft of the matrix, direction of the fibers within the matrix, and the like), chemistry, method of bonding, and the like. It is contemplated that the fibrous structure may have any of the following advantages over other materials traditionally used: better non-acoustic properties, such as better temperature resistance, hydrolytic stability, compression resistance, and mold/mildew resistance (versus foams and natural fiber, for example); better compression resistance and performance stability (versus mineral wool, for example); easier fabrication and installation (versus traditional nonwoven materials having a separately formed and installed facing layer or perforated metal panels, for example); easier molding and creation of a lower VOC and/or lower toxicity (versus resonated natural fiber and fiberglass type products, for example); improved flexibility and/or softness (versus a honeycomb structure, for example); improved ability to mold into a desired shape (versus a honeycomb structure, for example); improved ability to tune more parameters in the absorption matrix, such as fibers, layers, thickness, and bulk density (versus a honeycomb structure, for example); and structural properties, such as by providing a desired stiffness to the material.

Figure 1:
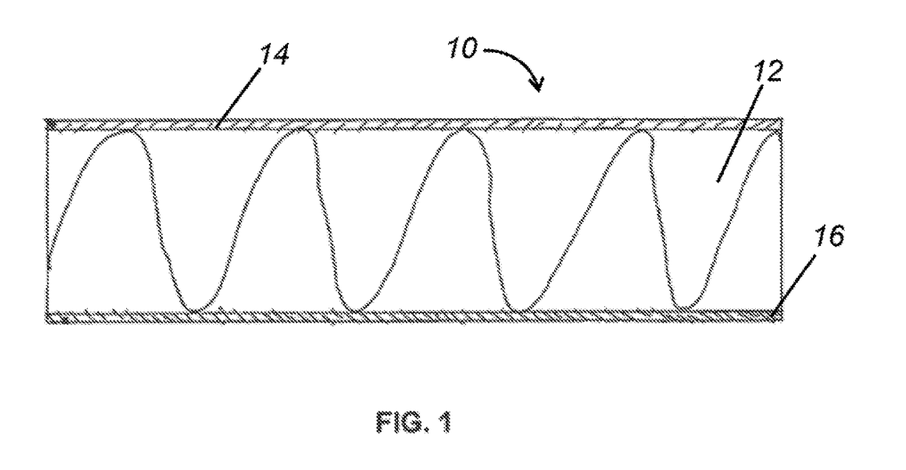
FIG. 1 is a cross-sectional view of an exemplary nonwoven fibrous structure in accordance with the present teachings.

Turning now to the figures, FIG. 1 illustrates a cross-sectional view of an exemplary fibrous structure 10. The fibrous structure 10 includes a fiber matrix 12. The fiber matrix 12 may include fibers having a softening and/or melting temperature above 190° C. The fibrous structure 10 also includes an optional facing layer 14, which may be a film (e.g., perforated or impermeable); foil (e.g., perforated or impermeable), which may be plain or reinforced; or a nonwoven or woven scrim, for example. The facing layer 14 may include or may be a pressure sensitive adhesive material. The optional facing layer 14 may be IR heat reflective. The optional facing layer 14 may be puncture-resistant. The fibrous structure 10 also includes an optional second layer 16 on the opposing side of the fiber matrix 12, which may be a second facing material or may be a pressure sensitive adhesive. The optional second layer 16 may be the same material as the optional facing layer 14, or may be different.

Figure 2:
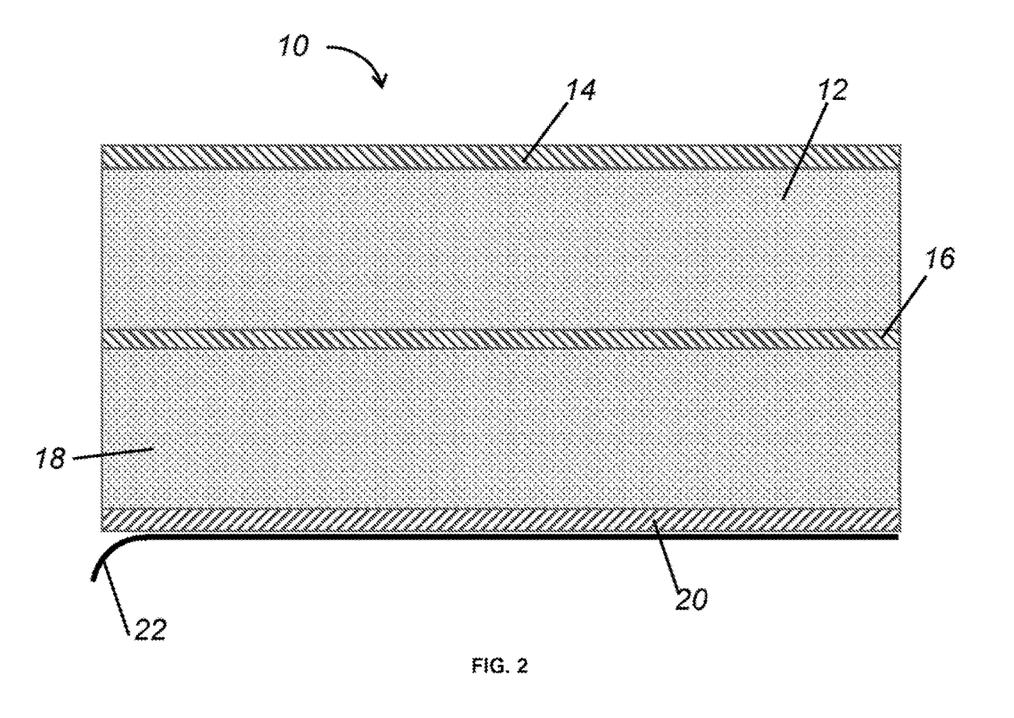
FIG. 2 is a cross-sectional view of an exemplary nonwoven fibrous structure having multiple layers in accordance with the present teachings.

FIG. 2 illustrates a cross-sectional view of a multi-impedance exemplary fibrous structure 10 having multiple layers. An optional facing layer 14 is attached to a side of a first fiber matrix 12. The optional facing layer 14, which may be a film, foil, scrim, and/or PSA, for example, may have a specific air flow resistance that is different from the specific air flow resistance of the first fiber matrix 12 to create a multi-impedance acoustic mismatched profile through the fibrous structure 10. A side of the first fiber matrix 12 opposite the optional facing layer 14 is attached to a middle layer 16, which may be a film, foil, scrim, and/or PSA, for example. The middle layer 16 may have a different air flow resistance from the first fiber matrix 12, enhancing the multi-impedance acoustic mismatched profile. The multi-impedance fibrous structure 10 includes a second fiber matrix 18 attached to the opposing side of the middle layer 16 so that the middle layer 16 is sandwiched between the first fiber matrix 12 and the second fiber matrix 18. A pressure sensitive adhesive 20 is located on the opposing side of the second fiber matrix 18. The pressure sensitive adhesive 20 includes a release liner 22, which allows a user to peel the release liner 22 away and adhere the fibrous structure 10 to a substrate (not shown).

While FIG. 2 illustrates a four-layered structure, the present teachings also contemplate a fibrous structure having fewer than four layers (e.g., a dual-layered system or a three layered system) or a fibrous structure having greater than four layers (e.g., a five-layered system, a six-layered system, or more) formed by adding additional lofted layers, additional layers having high specific air flow resistances, additional layers capable of withstanding high temperatures (e.g., temperatures up to about 250° C.) or another type of material, such as a material that provides acoustic, structural, or thermal properties. While the figure illustrates an alternating layered system (e.g., with lofted layers sandwiched between other higher air flow resistive layers), it is contemplated that other configurations are possible. For example, two or more fiber matrix layers may be located directly adjacent to each other. Two or more optional facing layers (e.g., film, foil, scrim, and/or PSA) may be located directly adjacent to each other.

The one or more layers of fiber matrices may be compressed, which may reduce the free volume (e.g., reducing the size of the interstitial spaces) between the fibers, thus reducing the amount of localized convective heat transfer within the matrix. The orientation of the fibers, being vertical, non-vertical, curved, slanted, or a combination thereof, may create a more restrictive conduction path from one side to the other (e.g., through the thickness) versus a completely vertical fiber. When the fibers are made non-vertical or having a varying orientation, there may be more fiber-to-fiber interaction, creating localized resistances to conduction between fiber-to-fiber contact points.

While the present teachings pertain to a thermoformable or otherwise shaped material, it is contemplated that the fibrous structure may be formed from a plurality of individual fibrous structures secured together. For example, individual fibrous structures may be joined together to form a three-dimensional shape. These fibrous structures may be joined via one or more fasteners, one or more adhesives, one or more hinges (or materials, such as a facing layer joining two individual structures and acting as a hinge), the like, or a combination thereof. Furthermore, it is contemplated that the fibrous structure may cover only a portion of an item to be insulated. The fibrous structure may cover one or more surfaces of an item or area to be insulated. For example, the fibrous structure may generally be shaped to fit within an engine bay area.

Parts by weight as used herein refers to 100 parts by weight of the composition specifically referred to. Any numerical values recited in the above application include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32, etc. are expressly enumerated in this specification. For values which are less than one, one unit is considered to be 0.0001, 0.001, 0.01, or 0.1 as appropriate. These are only examples of what is specifically intended and all possible combinations of numerical values between the lowest value, and the highest value enumerated are to be expressly stated in this application in a similar manner. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element; ingredient, component or step is not intended to foreclose additional elements, ingredients, components or steps.

What is claimed is:

1. An article comprising:
   a perforated foil; and
   a fibrous structure including one or more nonwoven material layers comprising a fiber matrix; wherein the fiber matrix is formed by distributing fibers via an air laying process or by distributing fibers via a carding and lapping process;
   wherein the fiber matrix comprises polymeric binder fibers having a softening and/or melting temperature of about 190° C. or greater;

wherein the polymeric binder fibers are bicomponent fibers comprising polybutylene terephthalate (PBT) and co-PET;

wherein the binder fibers have a length of about 70 mm or less;

wherein the article is adapted to withstand temperatures of about 190° C. or greater while in use; and wherein the article is a thermoacoustic insulation material.

2. The article of claim 1, wherein the polymeric binder fibers have a softening and/or melting temperature of about 225° C. or greater.

3. The article of claim 1, wherein the bicomponent fibers comprise a sheath that is amorphous, crystalline, or partially crystalline.

4. The article of claim 1, wherein the fibrous structure includes one or more films, facings, fabrics, or a combination thereof laminated to one or more sides of the one or more nonwoven material layers.

5. The article of claim 4, wherein the one or more films, facings, or fabrics have a temperature resistance that is greater than or equal to the temperature resistance of the polymeric binder fibers.

6. The article of claim 1, wherein the fiber matrix includes fibers of low flame and/or smoke emitting type.

7. The article of claim 1, wherein the fiber matrix includes fibers having IR reflective properties.

8. The article of claim 7, wherein the fibers having IR reflective properties include metallized fibers.

9. The article of any of claim 1, wherein a majority of the fibers of the fibrous structure are oriented about ±40 degrees from a vertical plane extending generally perpendicular to the length of the fibrous structure.

10. The article of claim 1, wherein a majority of the fibers of the fiber matrix are generally vertically or near-vertically oriented.

11. The article of claim 1, wherein the fiber matrix is compressed to produce fibers that are generally oriented in a Z-shape, an S-shape, or a C-shape over the thickness of the fiber matrix.

12. The article of claim 1, wherein the fiber matrix is an air laid structure.

13. The article of claim 1, wherein the fiber matrix is formed by distributing fibers via a carding and lapping process.

14. The article of claim 13, wherein the fiber matrix is vertically lapped, rotary lapped or cross-lapped.

15. The article of claim 1, wherein the fibrous structure is thermoformable.

16. The article of claim 1, wherein the fibrous structure includes one or more flexible portions to allow the fibrous structure to be positioned within an area to be insulated.

17. The article of claim 1, wherein the fibrous structure includes one or more fasteners, adhesives, or both, for securing the fibrous structure within an assembly, for securing the fibrous structure to an area to be insulated, or for holding the fibrous structure in a desired shape.

18. The article of claim 1, wherein the article is an engine bay material.

19. An article comprising:
   a fibrous structure including one or more nonwoven material layers comprising a fiber matrix; and
   a perforated foil;
   wherein the fiber matrix is formed by distributing fibers via a carding and lapping process;
   wherein the fiber matrix comprises polymeric binder fibers having a softening and/or melting temperature of about 190° C. or greater;
   wherein the polymeric binder fibers comprise polybutylene terephthalate (PBT) and co-PET;
   wherein the polymeric binder fibers have a length of about 70 mm or less;
   wherein the polymeric binder fibers are bicomponent fibers comprising a sheath that is amorphous, crystalline, or partially crystalline;
   wherein the article is adapted to withstand temperatures of about 190° C. or greater while in use;
   wherein the article is a thermoacoustic insulation material; and
   wherein the fibrous structure includes one or more fasteners, adhesives, or both, for securing the fibrous structure within an assembly, for securing the fibrous structure to an area to be insulated, or for holding the fibrous structure in a desired shape.

20. The article of claim 19, wherein the article comprises a scrim and a hot melt adhesive.

* * * * *